US012650190B1

(12) United States Patent

Matich

(10) Patent No.: US 12,650,190 B1

(45) Date of Patent: Jun. 9, 2026

(54) PROTECTIVE DEVICE FOR CONCRETE PUMPING HOSE COUPLERS

(71) Applicant: Michael Matich, Costa Mesa, CA (US)

(72) Inventor: Michael Matich, Costa Mesa, CA (US)

( * ) Notice: Subject to any disclaimer, the term of this patent is extended or adjusted under 35 U.S.C. 154(b) by 0 days.

(21) Appl. No.: 19/297,944

(22) Filed: Aug. 12, 2025

(51) Int. Cl.
F16L 35/00 (2006.01)
F16L 31/00 (2006.01)
F16L 57/00 (2006.01)

(52) U.S. Cl.
CPC ............... F16L 35/00 (2013.01); F16L 31/00 (2013.01); F16L 57/005 (2013.01)

(58) Field of Classification Search
CPC ......... F16L 57/04; F16L 57/02; F16L 57/005; F16L 2201/20; F16L 35/00; F16L 55/168; F16L 55/17; F16L 55/1075; F16L 57/1715; F16L 58/18; F16L 58/182; F16L 58/184; F16L 58/185; F16L 58/187; F16L 21/06; F16L 1/024; F16L 1/0243; F16L 57/06
USPC ...................................... 285/93, 45
See application file for complete search history.

(56) References Cited

U.S. PATENT DOCUMENTS 4,696,324 A * 9/1987 Petronko ............... F16L 59/161
285/47
4,741,559 A * 5/1988 Berghman .............. F16L 35/00
285/419
4,852,831 A * 8/1989 Sandstrom ............ F16L 59/135
285/47
5,348,044 A * 9/1994 Eugene ................. F16L 59/161
285/55
9,413,101 B1 * 8/2016 Nooner .................. H01R 13/52
9,518,690 B2 * 12/2016 Bélisle .................... F16L 35/00
10,060,570 B2 * 8/2018 Kersey .................... G01M 3/22
10,550,990 B2 * 2/2020 Stoltzfus ............... F16L 57/005
2016/0186893 A1 * 6/2016 Nakovski ................ F16L 57/02
138/110
2025/0320948 A1 * 10/2025 Foley ..................... F16L 57/02

* cited by examiner

*Primary Examiner* — David Bochna
(74) *Attorney, Agent, or Firm* — Manuel de la Cerra

(57) ABSTRACT

A protective device is provided for couplers of hoses used in pumping concrete. The device includes two device halves configured to enclose the hose coupler and to secure together using a tool-free detent pin assembly having a shaft, spring-loaded ball bearings, and a manually operable extraction feature. Each device half includes a coupler channel to inhibit longitudinal movement and a sacrificial exterior layer over a wear indicator. The wear indicator may comprise a cellular or scaffold structure or a layer of contrasting color beneath the exterior surface. Visual exposure of the indicator signals the need for replacement. The protective device is configured to move with the hose during pumping operations, preventing abrasion damage to flooring surfaces caused by hardened concrete residue on couplers. The design supports low-cost fabrication, simplified replacement, and enhanced protection of finished floors in commercial and industrial environments.

18 Claims, 8 Drawing Sheets

15.1, 15.2

55

57

15.1,
15.2

55

55

15.1,
15.2

PROTECTIVE DEVICE FOR CONCRETE PUMPING HOSE COUPLERS

CROSS-REFERENCE TO RELATED APPLICATIONS

None.

TECHNICAL FIELD

The present disclosure relates to protective structures for industrial construction equipment, specifically protective devices for preventing damage to flooring surfaces by couplers of flexible hoses for pumping concrete.

BACKGROUND

Concrete pumping systems may employ flexible hose sections 5 joined by rigid hose couplers 8, nonlimiting examples of which are shown in FIG. 1, to transport cementitious materials under high pressure (e.g., 500-2000 psi). These couplers 8 are often made of steel. They may accumulate hardened concrete residue that becomes abrasive when dragged across flooring surfaces. This abrasive action can cause significant damage to finished floors—for example, scratches, scuffs, or material loss—in commercial or industrial settings with polished concrete or epoxy-coated surfaces. A single coupler 8 can cause thousands of dollars in repair costs over a single project due to repeated scraping across the floor.

Attempted solutions such as a cradle-type support 9 shown in FIG. 2 elevate hose sections 5 above flooring surfaces. However, such supports 9 have significant limitations. These supports 9 may be intended to be stationary, requiring manual repositioning as the hose moves. This increases labor costs and downtime. They may also lack secure engagement with the hose assembly, often slipping during the pulsing or jerking motion caused by pressure fluctuations in the pump (e.g., 10-20 cycles per minute). A need exists for an improved solution to the problem of flooring damage caused by such hose couplers.

SUMMARY

The present disclosure addresses the foregoing needs and provides other benefits by introducing a novel protective device for couplers of hoses for pumping concrete. Provided in various example embodiments is a protective device comprising two symmetrical device halves that enclose such hose couplers and are removably held together, for instance using a detent pin mechanism. Example detent pin mechanisms may include spring-loaded ball bearings and a pull ring. This enables tool-free insertion and removal for convenient assembly and disassembly. The two symmetrical device halves may comprise one or more inner surfaces defining an internal channel configured to engage a flange portion of a hose coupler. This prevents the protective device from shifting longitudinally along the hose.

In various example embodiments, the protective device may further include an outer surface featuring a wear indicator system having a sacrificial outer wear layer. The wear indicator system may comprise a cellular or scaffold structure or one or more contrasting-colored polymeric layers. A cellular or scaffold structure may comprise a repeating internal lattice or other voided geometry distinguishable from the exterior material or surface, such as a honeycomb structure. Exposure of the wear indicator following degradation of the outer wear layer may serve as a visual cue that the protective device is approaching or has reached the end of its service life. Such a cellular or scaffold structure may offer various manufacturing advantages. For example, it may be amenable to efficient production using conventional molding or additive techniques. It may reduce the amount of raw material required. It may also simplify the tooling and fabrication processes required for creating internal support geometries within the protective device structure. Such configurations may reduce production costs. They may also decrease the overall weight of the protective device, making it easier to handle during installation and replacement. When the sacrificial outer wear layer degrades, exposure of the underlying cellular or scaffold structure can indicate that the protective device is approaching or has reached the end of its service life and should be replaced.

Alternatively, a wear indicator may be implemented as a layer formed from one or more polymers of distinctly different color(s) than the sacrificial outer wear layer. In such example embodiments, the exterior sacrificial outer wear layer may be designed to gradually wear away during use. This reveals one or more contrasting-colored interior layer(s) beneath it. Such color changes may provide clear, immediate visual cues that the device half is approaching or has reached the end of its effective life and should be replaced. Such structures may be configured to ensure continued protection of flooring surfaces. They also enable timely and cost-effective replacement of worn components.

Accordingly, provided in various example embodiments is a protective device for a coupler of a hose for pumping concrete. The protective device may comprise a first device half and a second device half. Each device half defines a semi-cylindrical interior shape configured to engage an exterior profile of the coupler. Each device half may be configured to removably engage the other by hand-operation without tools to form a removable enclosure about the coupler. Each device half may further comprise a sacrificial exterior layer disposed over support material. One or more wear indicators may be positioned beneath the sacrificial exterior layer. The one or more wear indicators may be configured to become visible from beneath the sacrificial exterior layer upon wearing away of the sacrificial exterior layer.

In some embodiments, the one or more wear indicators may comprise a cellular or scaffold structure. In other embodiments, the wear indicators may comprise one or more materials of contrasting color to the sacrificial exterior layer. The sacrificial exterior layer may be formed of a material having lower hardness than the underlying support material. The support material in various example embodiments may also be referred to as load-bearing material or the structural core of each device half. For example, the exterior layer may be formed of a polymer having a Shore D hardness of 50-60. The support material may be formed of a polymer having a Shore D hardness of 70-80.

The protective device may optionally comprise a detent pin system including a shaft, one or more spring-loaded ball bearings, a spring, and a pull ring. This system may be configured to removably engage each device half with the other by hand-operation without tools. The pull ring may be attached to the shaft of the detent pin. It may enable manual removal of the detent pin without tools. Each device half may include a detent pin lock receiver configured to engage the ball bearings and releasably secure the detent pin in a locked position. The detent pin may permit rotational freedom within the lock receiver while remaining secured in an axial direction. In some embodiments, the detent pin lock receiver may include a metal insert having an internal groove adapted to engage the spring-loaded ball bearings.

The semi-cylindrical interior shape may further comprise a coupler channel shaped to engage the coupler and inhibit longitudinal movement of the protective device along the hose. The interior shape may also be configured to surround a portion of the exterior surface of the hose. The two device halves may be substantially identical. The device halves may be formed of a polymeric material selected to resist abrasion, impact, and chemical degradation caused by exposure to concrete slurry.

An additional embodiment may comprise a protective device wherein each device half defines a semi-cylindrical interior shape and includes a hose receiver hole conforming to the coupler's outer diameter. The device halves may interlock to form a complete enclosure. A detent pin assembly may be provided with a shaft, spring-loaded ball bearings, a spring, and a pull ring. The shaft passes through aligned pin receivers in each device half and engages a detent pin lock receiver that may include a metal insert. A sacrificial exterior layer of a polymer having a Shore D hardness of 50-60 may be disposed over a wear indicator comprising a scaffold or cellular structure. A coupler channel may be formed to engage a flange of the coupler and inhibit longitudinal movement.

In various example embodiments, the device halves can each comprise exterior surfaces that define hemispheres. When assembled, the protective device forms a sphere-like structure around the hose coupler. This is advantageous because the outer surface will not have any sharp edges. Also, the spherical shape results in point contact with the flooring. This causes it to wear a spot of increasing diameter as the wear deepens. This provides an automatic and passive additional geometric indicium of wear status.

Methods may also be provided for protecting a concrete surface from abrasion caused by a coupler of a hose for pumping concrete. An example method may comprise providing such a protective device, positioning the first and second device halves around a coupler of a hose for pumping concrete, engaging the semi-cylindrical interior shapes of the device halves with the exterior profile of the coupler, and removably engaging the device halves by hand-operation without tools to form a removable enclosure about the coupler.

In certain embodiments, the protective device may include a detent pin with spring-loaded ball bearings, a spring, and a pull ring. Each device half may include a detent pin lock receiver. The method may further comprise inserting the detent pin until the spring-loaded ball bearings engage a groove in the detent pin lock receiver. The method may also include disengaging the device halves by hand-operation without tools and removing one or both device halves when the one or more wear indicators become visible from beneath the sacrificial exterior layer. In some configurations, the detent pin may include a pull ring. The method may further comprise removing the detent pin by pulling on the pull ring.

The embodiments described in this summary are merely illustrative examples of various aspects that may be employed. These examples are not intended to limit the scope of the invention, which is defined solely by the claims. Various modifications, alternatives, and additional or different embodiments may be made without departing from the scope of the claims.

BRIEF DESCRIPTION OF THE DRAWINGS

The accompanying drawings, which are incorporated in and constitute part of this specification, illustrate example embodiments and together with the description, explain various principles of the disclosed embodiments. For clarity, simplicity, and flexibility, not all elements, components, or specifications are defined in all drawings. Not all drawings corresponding to specific steps or example embodiments are drawn to scale. Emphasis is instead placed on illustration of the nature, function, and product of the system and method described herein.

Embodiments described herein are exemplary and not restrictive. Embodiments will now be described, by way of examples, with reference to the accompanying drawings, in which.

DETAILED DESCRIPTION OF EXAMPLE EMBODIMENTS

Figure 1:
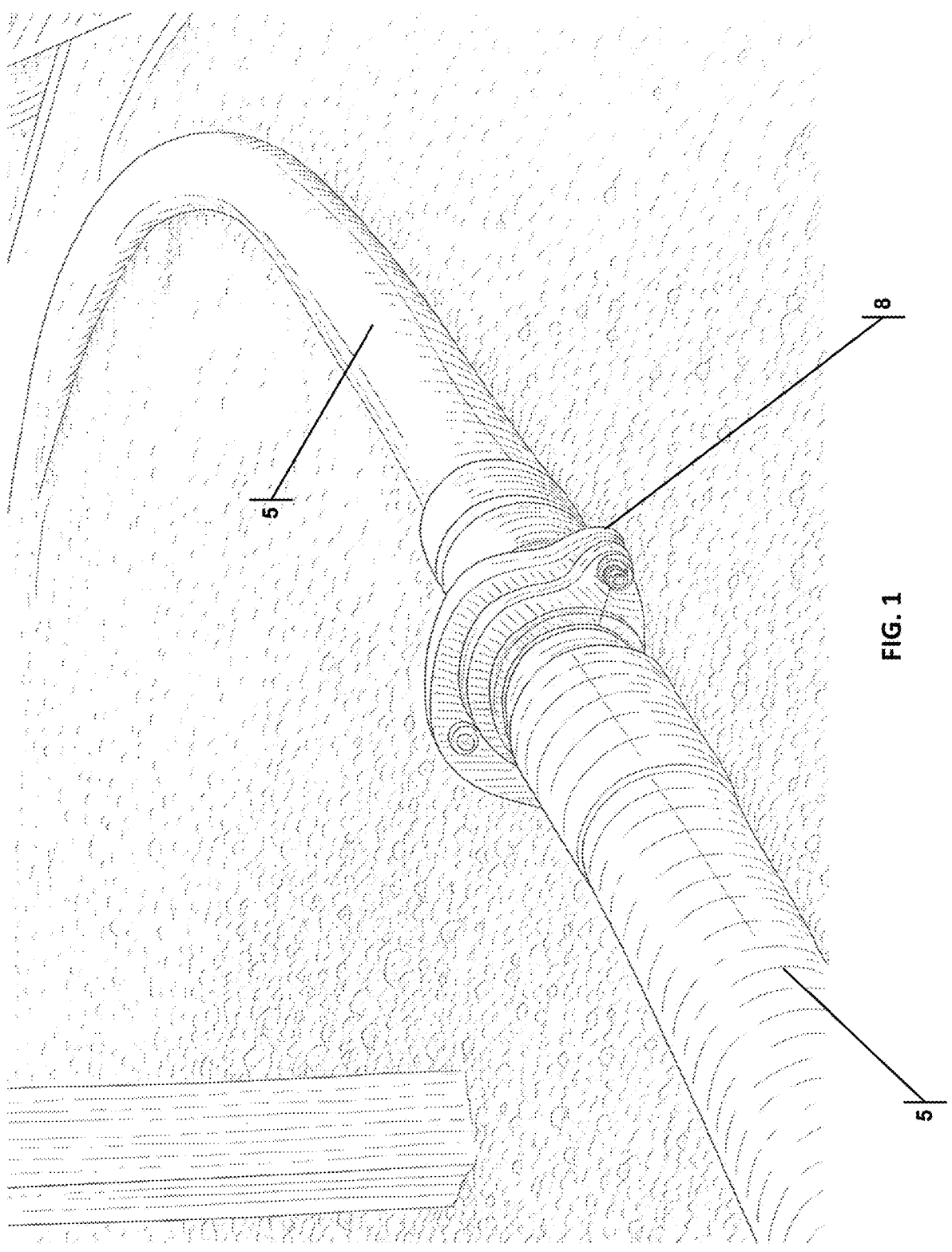
FIG. 1 is a schematic view of two sections of hose for pumping concrete joined by an example hose coupler.

Reference is made herein to specific example embodiments, some of which are illustrated in the accompanying figures. While the subject matter is described in conjunction with these example embodiments, it will be understood that it is not intended to limit the scope of the claims to the configurations or implementations shown and described. To the contrary, it is intended that various alternatives, modifications, and equivalents be encompassed within the scope of the claims as would be apparent to persons of skill in the art.

In the following description, numerous specific details are set forth to provide a thorough understanding of certain example embodiments. However, implementations may be carried out without some or all these specific details. In other instances, process operations known to persons of ordinary skill in the art have not been described in detail so as not to obscure relevant aspects of the disclosed subject matter. Various components, operations, or relationships may be described in the singular for clarity, although multiple instances or variations may be employed in certain embodiments. Similarly, method steps are not necessarily presented in a required order, and some steps may be omitted or rearranged depending on the implementation. Furthermore, descriptions of connections or communications between entities should not be interpreted as requiring a direct or uninterrupted link, unless expressly stated; intermediate components or indirect relationships may be present in many embodiments.

As used herein, certain terms are defined as follows for clarity:

"Cellular structure" includes honeycomb, lattice, foam, or other voided geometries.

"Scaffold structure" refers to any repeating internal support framework distinguishable from the exterior material.

"Coupler channel" means an elongated groove or notch that interfaces with a flange or protrusion of the hose coupler.

"Semi-cylindrical" encompasses curved or concave shapes suitable for engaging cylindrical or near-cylindrical couplers.

"Substantially identical" means identical other than different markings, colors, or nonfunctional aspects, if any, and identical other than normal manufacturing variations.

The following list of example features is provided for ease of reference, where like reference numerals designate corresponding features throughout the specification:

Hose for pumping concrete Section (5)
Hose Coupler (8)
Support Device (Prior Art) (9)
Protective Device (10)
First Device Half (15.1)
Second Device Half (15.2)
Hose Receiver Hole (20)
Detent Pin (25)
Pull Ring (25.1)
Shaft (25.2)
Ball Bearing (25.3)
Spring (25.4)
Hose Coupler Channel (35)
Detent Pin Receiver (40)
Detent Pin Lock Receiver (45)
Detent Pin Lock Receiver Insert (45.1)
Complementary Detent Pin Receiver (50)
Wear Indicator (Scaffold Honeycomb) (55)
Exterior Layer (57)

Figure 3A:
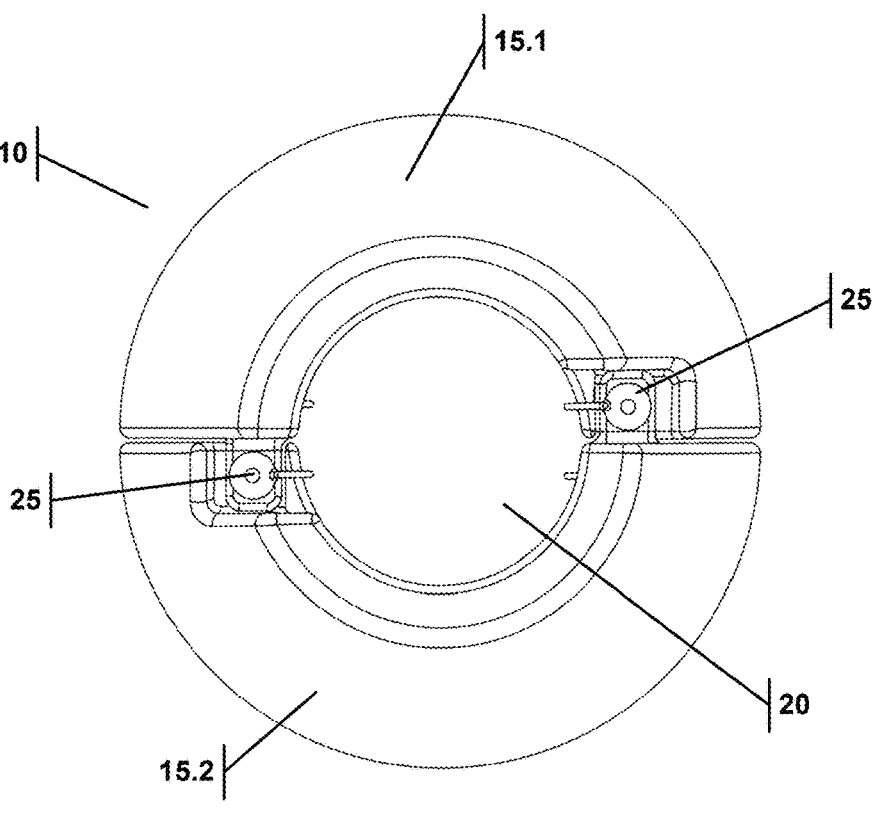
FIG. 3A is a front view of an example two-part protective device in its assembled state, showing examples of symmetrical device halves and detent pins.
Figure 3B:
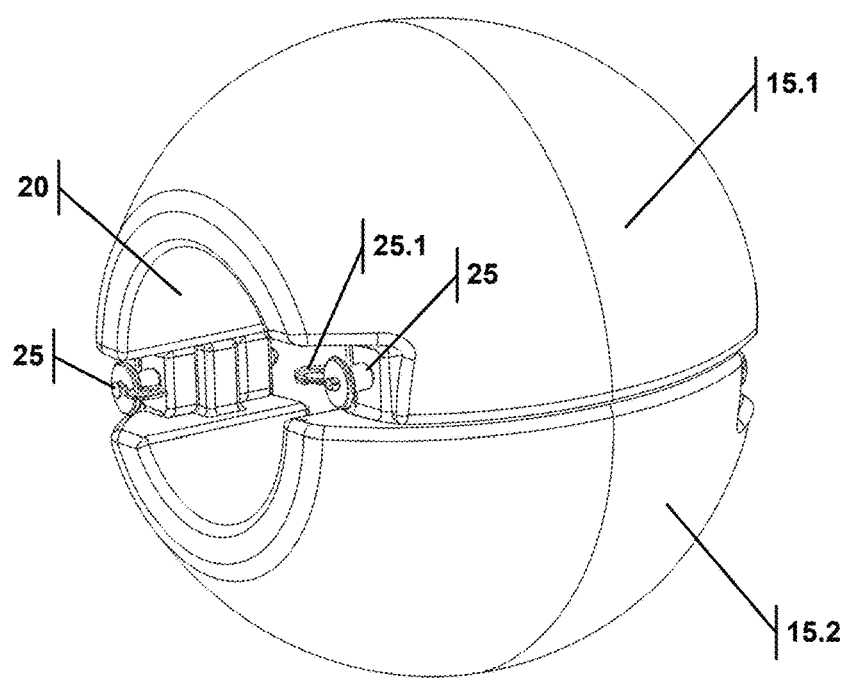
FIG. 3B is an isometric view of an example of an assembled protective device, showing the enclosure in the position of being closed around a hose coupler.

FIGS. 3A and 3B illustrate an example protective device (10) adapted to encase a hose coupler (8) joining adjacent sections of hose for pumping concrete (5). The protective device (10) is configured as two opposing, symmetrical semi-cylindrical device halves, identified as a first device half (15.1) and a second device half (15.2). When joined, they form a complete enclosure around the hose coupler (8).

The protective device (10) is designed to remain in position during operation. It prevents the coupler (8)—often contaminated with abrasive concrete residue—from contacting and damaging the flooring or surrounding structures. The device halves are constructed from a wear-resistant polymer, such as high-density polyethylene or polyurethane. These materials resist abrasion and chemical degradation from concrete slurry (pH approximately 12-13).

Figure 4A:
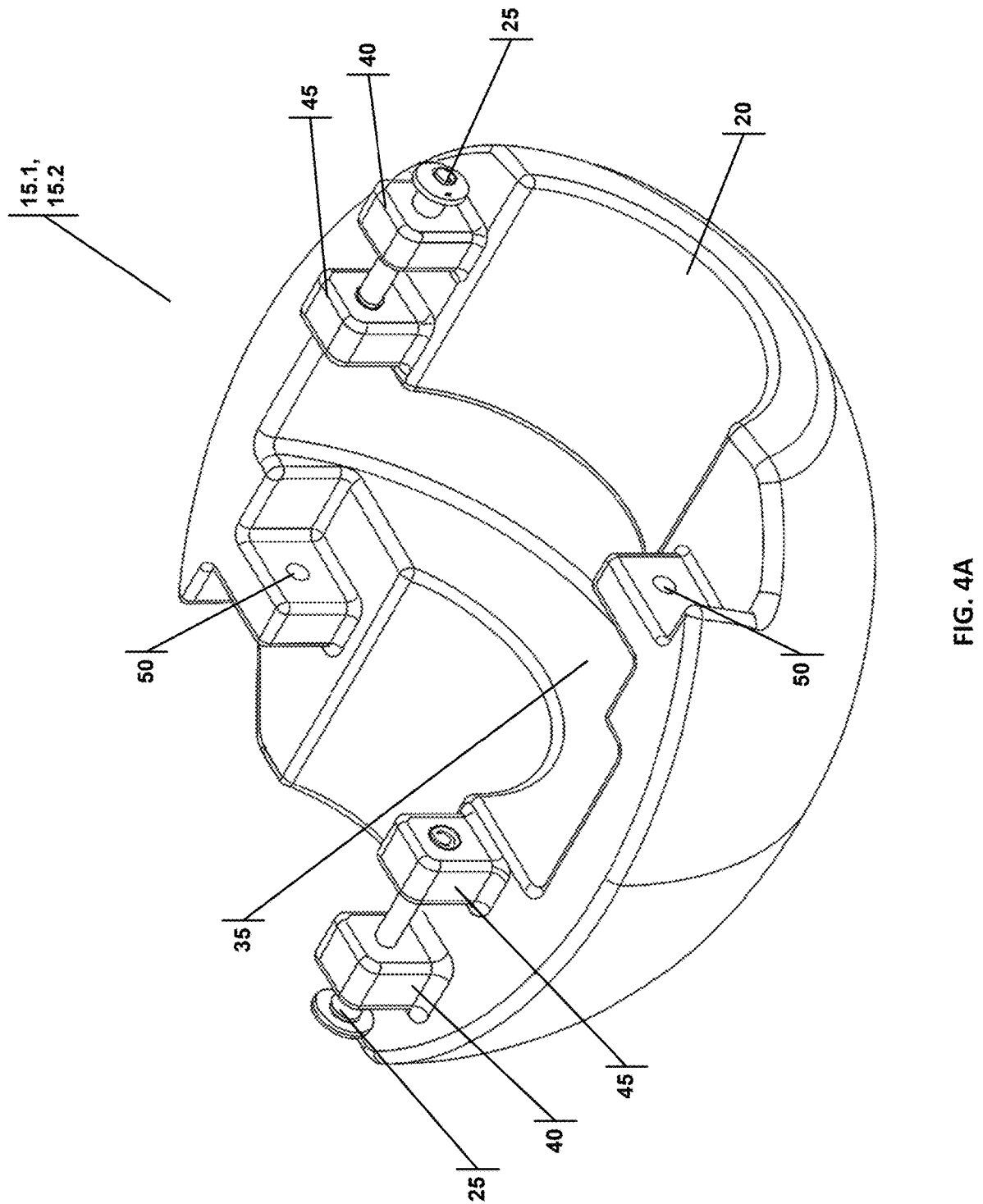
FIG. 4A is a side view of an example of one device half, showing an example hose receiver hole, coupler channel, and detent pin receiver.
Figure 4B:
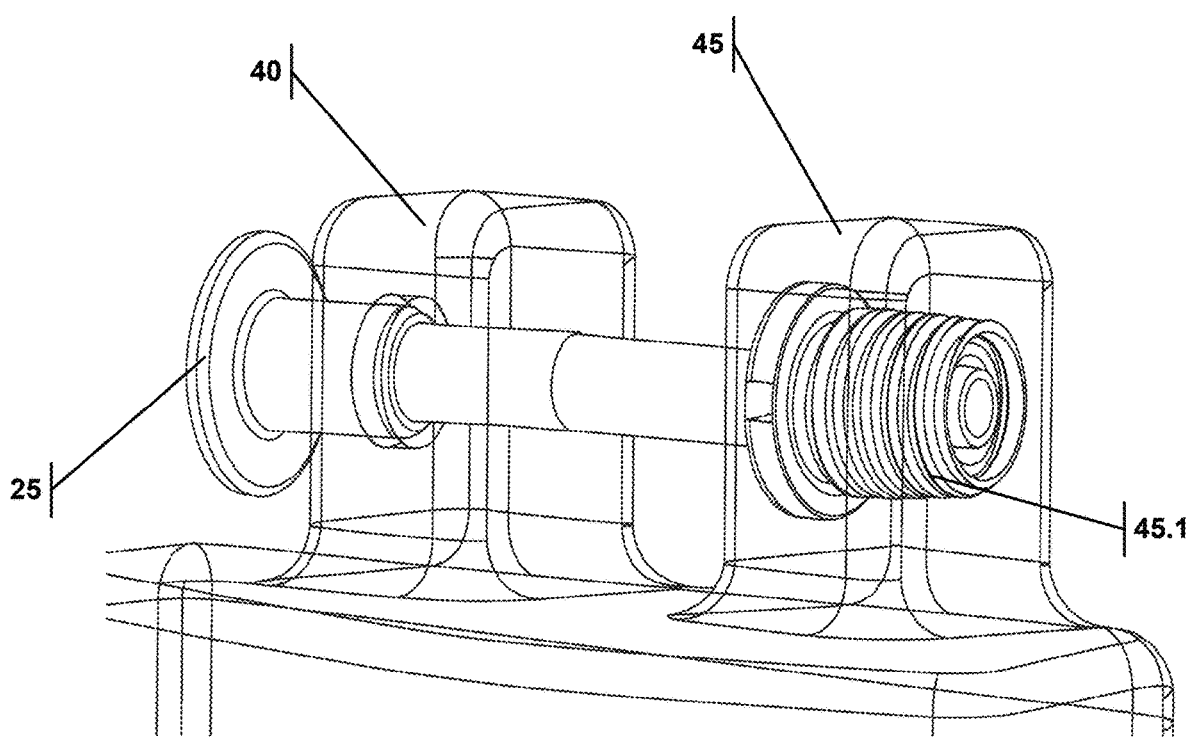
FIG. 4B is an isometric view of an example detent pin locking system, showing its interaction with the lock receiver, which is illustrated to be transparent for clarity.

As shown in FIG. 4A, each device half (15.1, 15.2) in this example embodiment features a contoured hose receiver hole (20). This is dimensioned to accommodate the circumference of the hose coupler (8). It supports the structure concentrically around the hose assembly. The interior of the protective device includes a hose coupler channel (35). This is an elongated groove or notch that interfaces with the hose coupler (8). The coupler channel (35) inhibits longitudinal displacement of the protective device (10) once installed by physically straddling the hose coupler (8).

Figure 4C:
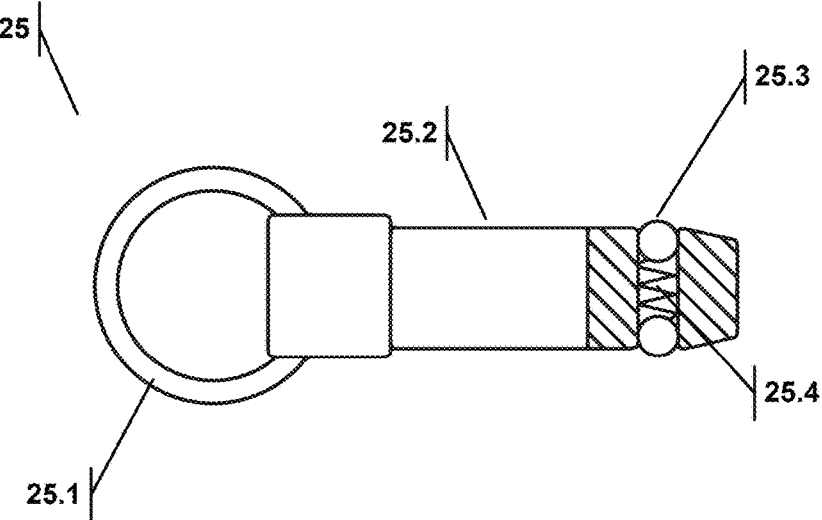
FIG. 4C is top plan view of an example detent pin, detailing examples of a shaft, spring-loaded ball bearings, spring, and pull ring, shown relatively larger in scale than in the other figures.

FIG. 4A illustrates an example embodiment in which the two device halves (15.1, 15.2) are mechanically fastened together. By way of example and not limitation, a detent pin (25) may be used. It includes a shaft (25.2), spring-loaded ball bearings (25.3) embedded into its surface, a spring (25.4) applying outward pressure to the ball bearings (25.3), and a pull ring (25.1) affixed to one end. This example configuration is illustrated in FIG. 4C. To secure the assembly, in the example shown, the shaft (25.2) is inserted through a detent pin receiver (40) in the first device half (15.1). It traverses a complementary detent pin receiver (50) in the second device half (15.2). It terminates in a detent pin lock receiver (45) back in the first device half (15.1). The detent pin lock receiver (45) may include a hardened detent pin lock receiver insert (45.1), made of metal for example. This contains an annular groove or recess that receives the extended ball bearings (25.3) and locks the pin (25) in position. This type of mechanism may provide tool-free engagement and disengagement of the two device halves. A pull ring (25.1) or other manually engageable, hand-operable extraction structure facilitates rapid removal even in dirty or concrete-covered environments. For example, and not by way of limitation, other manually engageable, hand-operable extraction structures may be used, such as loops, tabs, knobs, tethers, handles, or other functionally equivalent structures.

Figure 5A:
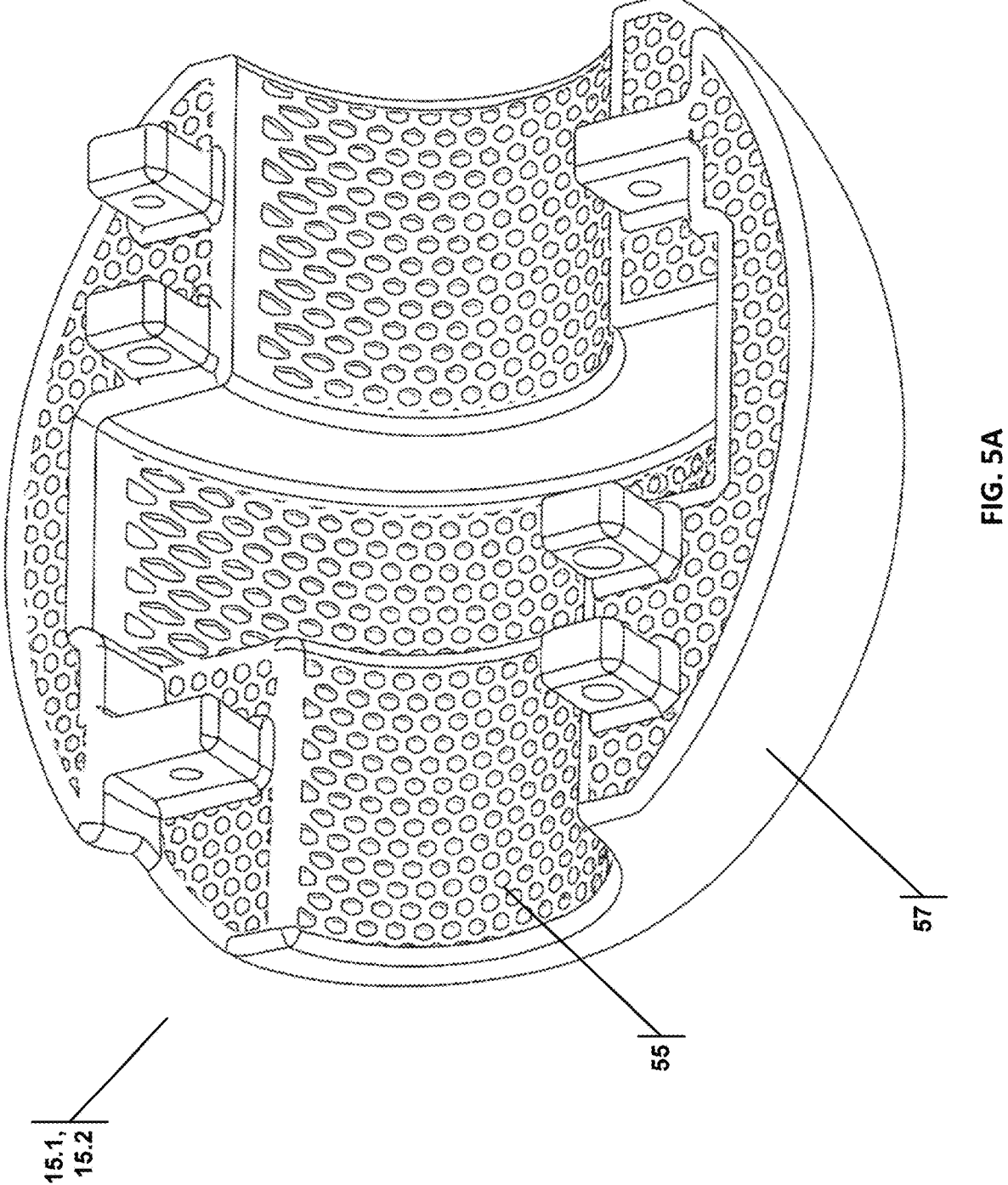
FIG. 5A is an isometric cross-sectional interior view of an example device half, showing an example of a cellular or scaffold structure beneath a partially cut-away exterior layer.
Figure 5B:
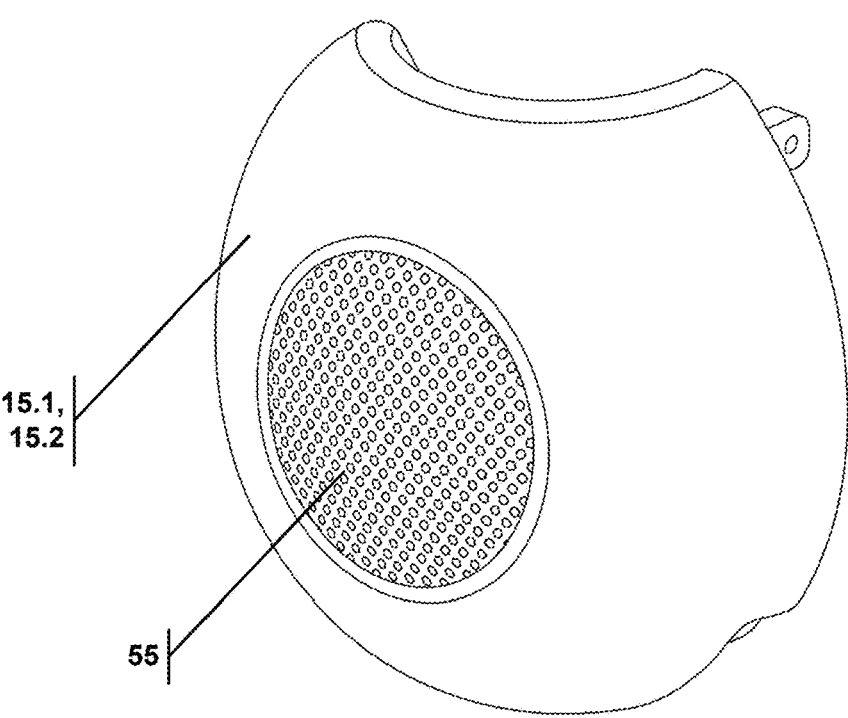
FIG. 5B is an isometric exterior view of the device half of FIG. 5A, illustrating an example of a cellular or scaffold structure visible as a wear indicator after the exterior layer is partially eroded or worn away.
Figure 5C:
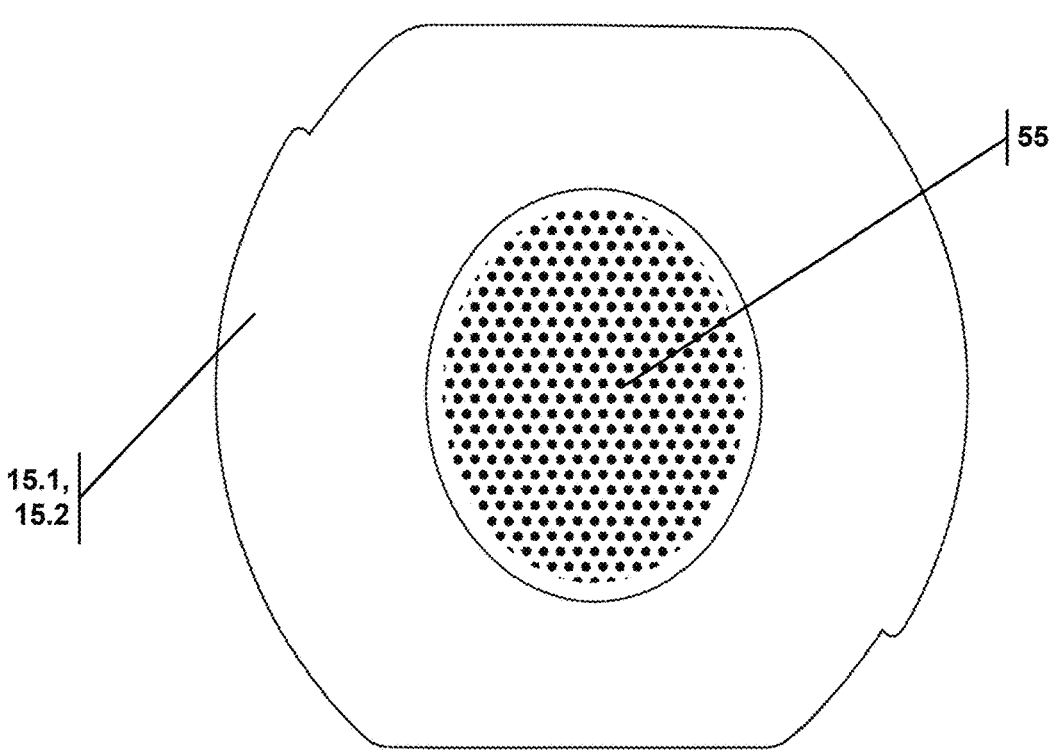
FIG. 5C is bottom view of the device half of FIG. 5A, illustrating an example of a cellular or scaffold structure visible as a wear indicator after the exterior layer is sufficiently eroded or worn away to indicate the need for replacement.
Figure 6A:
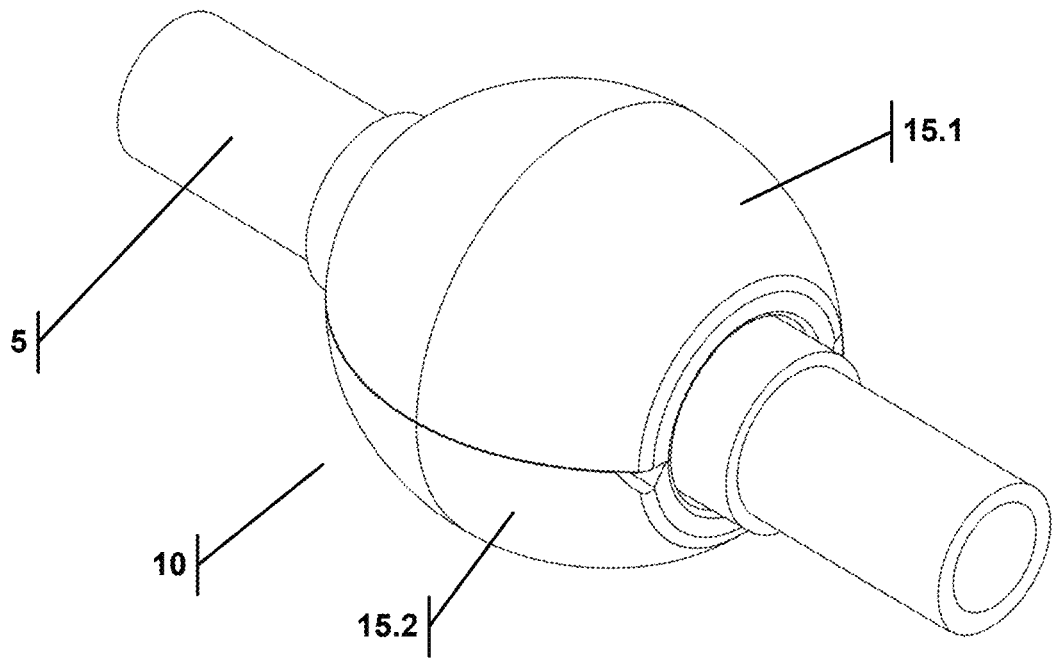
FIG. 6A is an isometric top view of an example protective device mounted on an example hose for pumping concrete and around an example hose coupler, as used during operation.
Figure 6B:
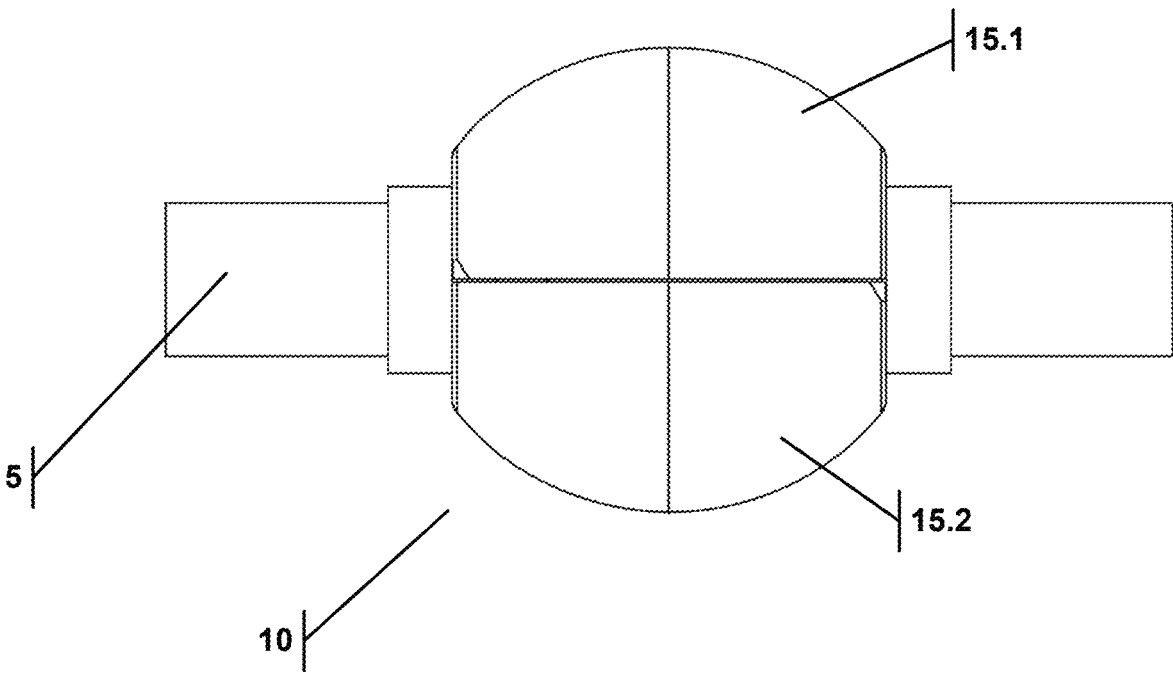
FIG. 6B is a side elevation view of the example protective device of FIG. 6A, mounted on an example hose for pumping concrete and around an example hose coupler, as used during operation.

As shown in FIG. 5A, each device half may feature a sacrificial exterior layer (57), for instance in a range of 1-10 mm thick in various example embodiments, such as approximately 2-5 mm thick. This is made of a softer material such as a polymer (e.g., Shore D hardness 50-60) to minimize floor damage. Beneath this exterior layer, a wear indicator (55) may be provided. This may be either as a cellular or scaffold structure (FIGS. 5A-5C) or one or more contrasting-colored polymeric layer(s) (e.g., red interior vs. black exterior). The cellular or scaffold structure, for instance with cell sizes in a range of 1-10 mm in various example embodiments, such as 3-5 mm, may reduce material use by up to 25% and weight by up to 20%. It may facilitate production via injection molding, for example. As the exterior layer wears (e.g., to 0.5 mm thickness) by being dragged across the flooring surface or otherwise used, the wear indicator eventually becomes visible. This signals replacement. The protective device's design ensures it remains fixed relative to the hose assembly during the pump's pulsing motion (10-20 cycles/min). Unlike cradle supports (FIG. 2), which require manual repositioning, this design eliminates such needs.

The geometry of the device halves (15.1, 15.2) and the structural rigidity of the detent pin system ensure that once assembled, the protective device (10) securely retains its position. It resists torsional or vibrational displacement relative to the hose assembly. The spring-loaded detent system additionally permits limited rotational tolerance of the pin while maintaining axial restraint relative to the hose assembly. This design provides robust coupling integrity. It also allows repeated reuse of the protective device.

The protective device may be constructed from any suitable materials. For example, it may use a combination of molded polymeric device halves (15.1, 15.2) and precision machined stainless steel or comparable corrosion-resistant alloys for the detent pin (25) and receiver insert (45.1). The materials may be selected to exhibit resistance to chemical degradation by concrete slurry. They provide long-term durability across construction site conditions. Other example embodiments may include snap-fit or magnetic locking mechanisms to removably join the two device halves (15.1, 15.2). They may offer compatibility with various hose diameters (e.g., 2-8 inches). They may also include electronic wear sensors embedded within or under the exterior layer(s). For instance, such sensors could provide auditory or digital alerts in addition to visual indicators.

The protective device improves operational efficiency through a two-part, removable, sacrificial design with a wear indicator and a tool-free locking mechanism. It prevents damage to sensitive flooring surfaces, such as polished concrete or coated floors, caused by abrasive concrete residue on hose couplers during high-pressure pumping operations. The protective device reduces floor repair costs. It enhances operational efficiency by eliminating repositioning. It improves safety by minimizing manual handling. Synergistically, the combination of the wear indicator and tool-free mechanism can reduce downtime by significant margins, such as up to 50% in certain operational scenarios, based on comparative testing with prior art supports.

Figure 2:
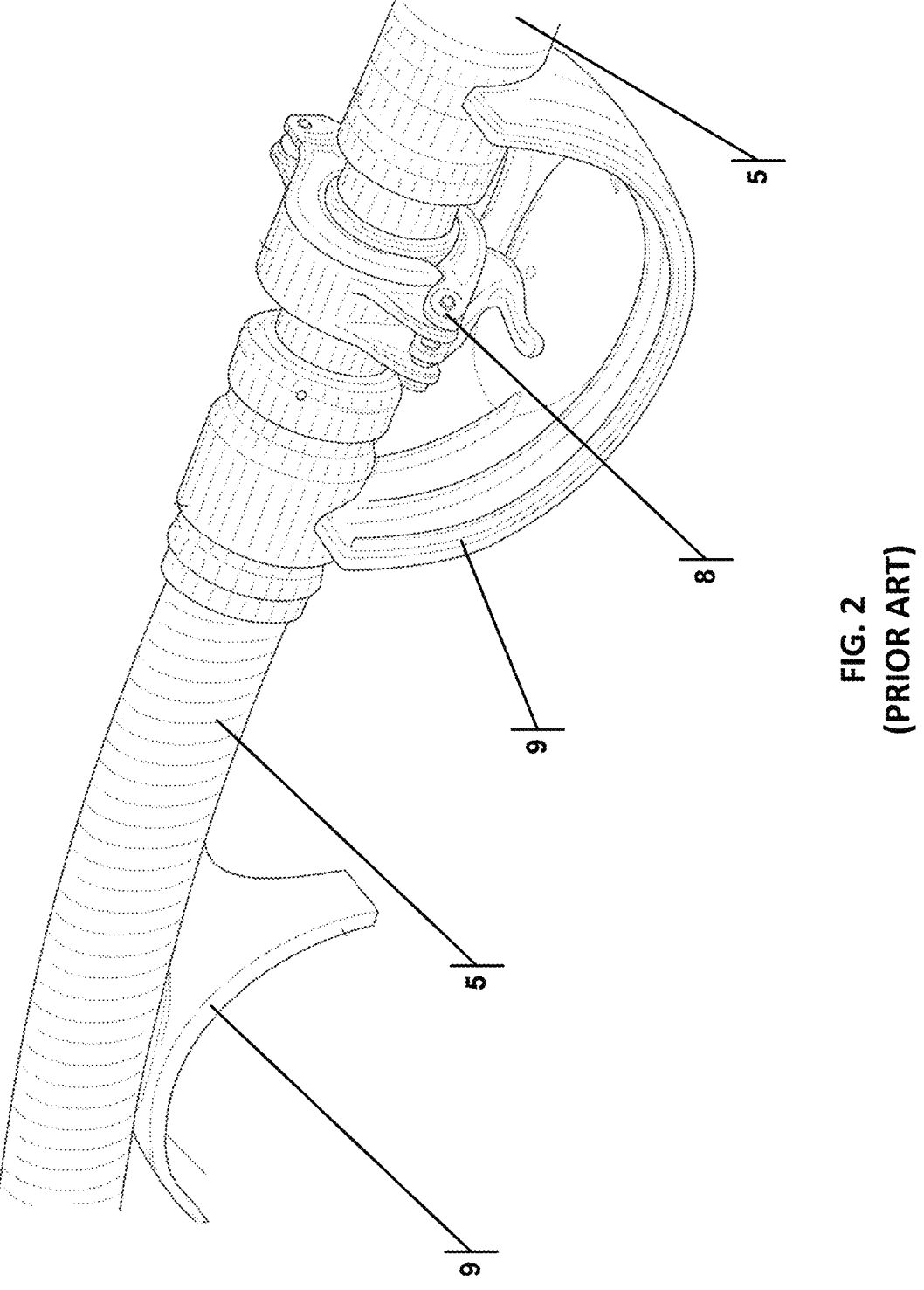
FIG. 2 is a schematic view of two sections of hose for pumping concrete joined by an example hose coupler, illustrating a cradle-type support device elevating the hose coupler above a flooring surface.

In various example embodiments, the protective device provides numerous improvements over solutions such as the support device (9) shown in FIG. 2. Unlike these stationary cradle devices that require two-handed operation and do not follow the hose during pumping, the disclosed protective device remains fixed in place around the coupler. It travels with the hose. It offers both protection and monitoring automatically in a dynamic, passive fashion. The tool-free locking mechanism enhances ease of use, allowing one-handed operation.

Persons of ordinary skill in the art are aware that the use cases, structures, schematics, flow diagrams, and steps described and implied herein may be performed in any order or sub-combination without departing from the broader scope of the inventive concept disclosed herein. Every embodiment may be unique, and step(s) of method(s) may be either shortened or lengthened, overlapped with other activities, postponed, delayed, and/or continued after a time gap.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter.

As used herein, the singular forms "a," "an," and "the" include plural references unless the context clearly indicates otherwise. Thus, for example, reference to "a cable"

includes a single cable as well as a bundle of two or more different cables, and the like. The terms "comprise," "comprising," "includes," "including," "have," "having," and the like, used in the specification and claims are meant to be open-ended and not restrictive, meaning "including but not limited to."

In the foregoing description, numerous specific details are set forth, such as specific structures, dimensions, processes, parameters, etc., to provide a thorough understanding of the present disclosure. The features, structures, materials, or characteristics may be combined in any suitable manner in one or more embodiments. The words "example", "exemplary", "illustrative" and the like, are used herein to mean serving as an example, instance, or illustration. Any aspect or design described herein as "example" or its equivalents is not necessarily to be construed as preferred or advantageous over other aspects or designs. Rather, use of the words "example" or equivalents is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number ±10%, such that "about 10" would include from 9 to 11.

Although the present disclosure has been described with reference to specific exemplary embodiments, it will be evident that the various modifications and changes can be made to these embodiments without departing from the broader scope of the disclosure. Accordingly, the specification and drawings are to be regarded in an illustrative sense rather than in a restrictive sense. It will also be apparent to the skilled artisan that the embodiments described above are specific examples of a single broader disclosure which may have greater scope than any of the singular descriptions taught. There may be many alterations made in the descriptions without departing from the scope of the present innovation, which is defined solely by the claims.

The invention claimed is:

1. A protective device for a coupler of a hose for pumping concrete, comprising:
   a first device half and a second device half, each device half defining a curved interior shape configured to engage an exterior profile of a coupler of a hose for pumping concrete;
   each device half configured to removably engage the other by hand-operation without tools to form a removable enclosure about the coupler;

each device half comprising a sacrificial exterior layer disposed over support material, wherein the exterior layer comprises a material having lower hardness than the support material; and one or more wear indicators positioned beneath the sacrificial exterior layer and structurally distinct from the support material such that the one or more wear indicators are configured to become visible from beneath the sacrificial exterior layer upon wearing away of the sacrificial exterior layer.

2. The protective device of claim 1, wherein the one or more wear indicators comprise a cellular or scaffold structure.

3. The protective device of claim 1, wherein the one or more wear indicators comprise a material of contrasting color to the exterior layer.

4. The protective device of claim 1, wherein the exterior layer comprises a polymer having a Shore D hardness of 50-60, and the support material is formed of a polymer having a Shore D hardness of 70-80.

5. The protective device of claim 1, further comprising a detent pin having a shaft, one or more spring-loaded ball bearings, a spring, and a pull ring, all configured to removably engage each device half with the other by hand-operation without tools to form a removable enclosure about the coupler.

6. The protective device of claim 5, wherein the pull ring is attached to the shaft of the detent pin and enables manual removal of the detent pin without the use of tools.

7. The protective device of claim 5, wherein each device half comprises a detent pin lock receiver configured to engage said ball bearings to releasably secure the detent pin in a locked position.

8. The protective device of claim 7, wherein the detent pin permits rotational freedom within the lock receiver while remaining secured in an axial direction.

9. The protective device of claim 7, wherein the detent pin lock receiver includes a metal insert having an internal groove adapted to engage the spring-loaded ball bearings of the detent pin.

10. The protective device of claim 1, wherein each device half further defines a coupler channel shaped to engage the coupler and inhibit longitudinal movement of the protective device along the hose.

11. The protective device of claim 1, wherein the curved interior shape is further configured to surround an exterior surface of the hose.

12. The protective device of claim 1, wherein the first and second device halves are substantially identical.

13. The protective device of claim 1, wherein the device halves comprise a polymeric material selected to resist abrasion, impact, and chemical degradation caused by concrete slurry.

14. The protective device of claim 1, wherein the one or more wear indicators comprise an electronic sensor configured to provide an alert upon wearing away of the sacrificial exterior layer.

15. A protective device for a coupler of a hose for pumping concrete, comprising:

a first device half and a second device half, each defining a curved coupler recess and configured to interlock to form a complete enclosure around a hose coupler; each device half comprising a polymeric interior support material and a coupler receiver aperture conforming to the coupler's outer diameter;

a detent pin having a shaft, spring-loaded ball bearings, a spring, and a pull ring, the shaft configured to pass through a detent pin receiver in each device half and engage a detent pin lock receiver with a metal insert;

a sacrificial exterior layer disposed over the interior support material and comprising a polymer having a Shore D hardness of 50-60;

a wear indicator comprising a honeycomb scaffold structure disposed between the exterior layer and the interior support material; and a coupler channel formed in the enclosure to engage a flange or protrusion of the hose coupler and prevent longitudinal movement.

16. A method of protecting a concrete surface from abrasion caused by a coupler of a hose for pumping concrete, comprising:

providing a protective device comprising a first device half and a second device half, each device half defining a curved interior shape configured to engage an exterior profile of a coupler of a hose for pumping concrete, each device half comprising a sacrificial exterior layer disposed over support material, wherein the exterior layer comprises a material having lower hardness than the support material, and one or more wear indicators positioned beneath the sacrificial exterior layer and structurally distinct from the support material such that the one or more wear indicators are configured to become visible from beneath the sacrificial exterior layer upon wearing away of the sacrificial exterior layer;

positioning the first device half and the second device half around a coupler of a hose for pumping concrete;

engaging the curved interior shapes of each device half with the exterior profile of the coupler;

removably engaging the first and second device halves by hand-operation without tools to form a removable enclosure about the coupler.

17. The method of claim 16, wherein the protective device further comprises a detent pin with spring-loaded ball bearings, a spring, and a pull ring, and each device half comprises a detent pin lock receiver configured to engage the ball bearings to releasably secure the detent pin in a locked position, and wherein removably engaging the first and second device halves includes inserting the detent pin until the spring-loaded ball bearings engage a groove in the detent pin lock receiver.

18. The method of claim 16, further comprising:

disengaging the first and second device halves by hand-operation without tools and removing the first device half, the second device half, or both the first and second device halves, from enclosing the coupler, when the one or more wear indicators become visible from beneath the sacrificial exterior layer upon wearing away of the sacrificial exterior layer.

* * * * *